Patented Nov. 21, 1939

2,180,905

UNITED STATES PATENT OFFICE 2,180,905

PROCESS OF OBTAINING AN EXTRACT OF DUODENAL MUCOSA

Archibald Bruce Macallum and Nelles Boyd Laughton, London, Ontario, Canada

No Drawing. Application August 17, 1931, Serial No. 557,744

2 Claims. (Cl. 167—74)

The invention relates to a therapeutic agent useful in the treatment of diabetes mellitus and in the method of preparing the same.

The pancreas is a gland which possesses both an internal and an external secretion. For example, it is generally recognized that diabetes mellitus is due to an insufficiency of the hormone, insulin, which forms the internal secretion of the pancreas. On the other hand nutritional disturbances may result due to a deficiency in the external secretion or pancreatic juice. The liberation of the external secretion of the pancreas seems to be controlled by the hormone secretin, the existence of which in the duodenal mucosa has been demonstrated. There is some evidence indicating, however, that the duodenal mucosa elaborates a second hormone which controls the output of the internal secretion of the pancreas. In other words, it stimulates the formation of insulin or its liberation into the blood stream.

The present application deals with the isolation of the latter hormone which will be referred to as the insular hormone of the duodenal mucosa.

We have discovered that the insular hormone of the duodenal mucosa is adsorbed appreciably and carried down with the naturally occurring calcium phosphate of the duodenal mucosa. We have utilized this discovery in developing a method for isolating the hormone.

Our method consists in first extracting duodenal mucosa with a suitable solvent for the hormone and after certain preliminary steps for eliminating undesirable matter from the solution we add an excess of a material capable of adsorbing the active principle when precipitated from the solution.

The precipitation material may then be subjected to further treatment to liberate the adsorbed hormone or the precipitated material containing the hormone may be used directly as a therapeutic agent for oral administration. Following our discovery of the adsorption of the hormone in naturally occurring calcium phosphate of the duodenal mucosa we preferably employ as adsorbing material in our process a phosphate of calcium such, for example, as calcium acid phosphate. This material is in no way objectionable as a carrier for the active material when the product is administered orally.

A practical method for obtaining the insular hormone in accordance with our invention is as follows:

I. 14 kg. of fresh duodenal mucosa is quickly desiccated in the vacuum dryer. Frozen mucosa may also be used if freshly collected and promptly frozen. 2500 gm. of dry material of fatty consistency is obtained.

II. The product from step I is ground to a powder, treated with 12 liters of 95% alcohol, stirred with a mechanical stirrer, and 125 cc. of concentrated hydrochloric acid is added. (The final acid concentration should be about 0.3%.) The stirring is continued over a period of an hour and the solution is filtered. The insoluble residue is re-extracted.

III. The alcoholic filtrates are combined and distilled, preferably under diminished pressure, practically to dryness. The residual material possesses a brownish color and consistency of semi-liquid fat.

IV. The product from step III is placed in a flask and stirred vigorously with one liter of 1% aqueous hydrochloric acid during several hours and the extraction repeated with smaller portions of acid. The solution may be warmed sufficiently to allow the fat layer to separate.

V. The water layer is treated with 1 to 2% of animal charcoal (Darco), agitated during about one-half hour, and then filtered.

VI. To the filtrate is added 50 gm. of calcium acid phosphate and just sufficient hydrochloric acid to dissolve the latter. A saturated solution of sodium carbonate is added in just sufficient quantity to neutralize the solution (pH about 7.2–7.4).

VII. The precipitate is filtered off upon a suction filter and sucked as dry as possible but is not washed in order to avoid dissolving out some of the active principle. The filtrate is then again treated with calcium acid phosphate with just sufficient hydrochloric acid to dissolve the latter. A saturated solution of sodium carbonate is then added in just sufficient quantity to neutralize the solution. The second precipitate is filtered off upon a suction filter and sucked as dry as possible without washing. The combined precipitates are then dried in the vacuum dryer and the product is ready for clinical use.

The product resulting from the process as above described is a white or slightly brownish solid, the main bulk of which is calcium phosphate. The mixture represents only 1/400 of the original weight of the moist mucosa. It is practically free from the impurities present in ordinary aqueous and acid extracts obtained from the duodenal mucosa.

The product that we have prepared no doubt exists as a salt with calcium acid phosphate. It is free from proteins and gives none of the color reactions of peptones. The Millon color test is negative. Soluble extracts made from the product have no effect on blood pressure or respiratory rate in dogs even when given intravenously and therefore are free from impurities such as choline and histamine. The preparation as described meets the requirements of a practical drug.

The insular hormone has no effect on the blood sugar values of a totally depancreatized dog, since there is no pancreas tissue to be stimulated. In a partially depancreatized dog the administration of sugar causes an abnormal rise in the sugar content of the blood with an approach to normal value only during four or more hours. The oral administration of the duodenal principle to such an animal prior to the administration of sugar prevents the abnormally high rise of blood sugar and causes the value to drop to normal within two hours.

In normal rabbits the subcutaneous administration of the duodenal preparation one-half hour before intravenous sugar administration caused the blood sugar to return to normal within 15 to 25 minutes, whereas control animals require one to two hours for the blood sugar to return to the initial level. There is evidence that repeated injections have produced an effect persisting over several weeks.

Preliminary clinical results indicate that the extract exerts a favorable effect upon certain types of diabetes mellitus in a manner analogous to those observed in the animal experiments, the effects being more marked in mild than in severe diabetes.

The product as above described is entirely suitable for oral administration but for intravenous use the active principle can be liberated from the calcium phosphate by various methods. It may be dissolved by shaking the powder with distilled water or ½% hydrochloric acid solution. It can also be dissolved off the phosphate by alcohol or carbon tetrachloride in which case the solvent is evaporated and the residue dissolved in water. While the liberation of the active principle is important in order to obtain the isolated insular hormone, we have found that for practical purposes the product containing the calcium phosphate is preferred particularly for oral administration.

What we claim as our invention is:

1. The method of obtaining a therapeutic agent comprising extracting duodenal mucosa with an acidified alcohol solvent, removing the solvent, extracting the residue with aqueous acid, adding calcium acid phosphate to the solution, and precipitating the calcium acid phosphate.

2. The method of obtaining a therapeutic agent useful in treating diabetes mellitus comprising the extraction of duodenal mucosa with acidified alcohol, distilling said extract, extracting the residual material with acidified water, filtering through animal charcoal, adding calcium acid phosphate to the filtrate while maintaining sufficient acidity to prevent precipitation, subsequently reducing the acidity of said solution to cause precipitation of the phosphate of calcium thereby causing the hormone of the duodenal mucosa to be adsorbed by said phosphate and removing said precipitate and adsorbed hormone from the solution.

ARCHIBALD BRUCE MACALLUM.
NELLES BOYD LAUGHTON.